(12) United States Patent
Shadwell et al.

(10) Patent No.: US 11,668,095 B2
(45) Date of Patent: Jun. 6, 2023

(54) ROOFING FLASH ADAPTER CAP AND METHOD OF INSTALLING FLASH

(71) Applicant: OMG, Inc., Agawam, MA (US)

(72) Inventors: Peter J. Shadwell, Longmeadow, MA (US); Richard L. Belinda, Westfield, MA (US)

(73) Assignee: OMG, Inc., Agawam, MA (US)

(*) Notice: Subject to any disclaimer, the term of this patent is extended or adjusted under 35 U.S.C. 154(b) by 0 days.

(21) Appl. No.: 17/444,001

(22) Filed: Jul. 29, 2021

(65) Prior Publication Data
US 2022/0034093 A1 Feb. 3, 2022

Related U.S. Application Data (60) Provisional application No. 63/058,051, filed on Jul. 29, 2020.

(51) Int. Cl.
*E04D 13/14* (2006.01)
(52) U.S. Cl.
CPC .................. *E04D 13/1407* (2013.01)
(58) Field of Classification Search
CPC .................................................. E04D 13/1407
USPC .............................................................. 52/58
See application file for complete search history.

(56) References Cited

U.S. PATENT DOCUMENTS

| | | | | |
|---|---|---|---|---|
| 4,744,187 A * | 5/1988 | Tripp | ..................... | F16B 37/14 52/410 |
| 8,209,914 B2 * | 7/2012 | Stearns | ............... | E04D 13/1476 52/173.1 |
| 8,448,405 B2 * | 5/2013 | Schaefer | .................. | E04D 13/00 52/60 |
| 9,212,833 B2 * | 12/2015 | Stearns | ................ | H01Q 1/1207 |
| 10,060,133 B2 * | 8/2018 | Stearns | .................... | F24S 25/61 |
| 10,337,764 B2 * | 7/2019 | Ash | ......................... | F24S 25/00 |
| 10,630,228 B2 * | 4/2020 | Truthseeker | ............ | H02S 20/30 |
| 11,152,889 B1 * | 10/2021 | Affentranger, Jr. | ..... | F24S 25/30 |
| 11,174,643 B2 * | 11/2021 | Oddy | .................. | E04D 13/1476 |
| 2012/0138208 A1 * | 6/2012 | Stanley | ................ | H01Q 1/1214 156/536 |
| 2013/0298494 A1 * | 11/2013 | Corsi | ...................... | F24S 25/61 52/705 |
| 2014/0331594 A1 * | 11/2014 | Stearns | ................. | F16B 43/001 52/705 |
| 2020/0248457 A1 * | 8/2020 | Shadwell | ............... | F16M 13/02 |

* cited by examiner

*Primary Examiner* — Beth A Stephan
(74) *Attorney, Agent, or Firm* — Alix, Yale & Ristas, LLP (57) ABSTRACT

Disclosed herein is a roof mount installation assembly. The roof mount installation assembly includes a roof mount, a flashing patch, and an adapter cap. The roof mount has a base and a threaded post. The flashing patch has an opening. The flashing patch is configured to surround the base. The opening is configured to allow the threaded post to extend therethrough. The adapter cap is configured to be removably mounted over the flashing patch. The adapter cap is configured to apply a force to the flashing patch for sealing the flashing patch around the roof mount.

20 Claims, 14 Drawing Sheets

ROOFING FLASH ADAPTER CAP AND METHOD OF INSTALLING FLASH

CROSS-REFERENCE TO RELATED APPLICATION

This application claims priority to U.S. Provisional Patent Application No. 63/058,051, filed Jul. 29, 2020, the entire contents of which are incorporated herein.

BACKGROUND

This disclosure relates generally to installation of flashing over a roof anchor or mount assembly employed to secure equipment to a roof. More particularly, this disclosure relates to a removable adapter cap for maintaining a tight mating of flashing over a roof mount to allow welding of the flashing to an underlying roofing membrane.

Equipment, such as rack systems supporting solar panels, heat exchangers, air conditioners, communication equipment, etc., is commonly mounted to a flat roof of buildings and other industrial structures. A rack or frame is typically connected to the roof at multiple points by various mount assemblies. The mount assemblies function as connectors and supports. Numerous conventional roof mount assemblies dictated by their structural configuration are installed to flat roofs by techniques that jeopardize the integrity of the roof. It is common, for example, to cut through the upper roofing membrane and an insulation layer to obtain access for connecting to the underlying roof structure. Additionally, mechanically attaching mounts via elongate fasteners reduces the integrity of the water seal due to the puncture holes in the primary membrane overlaying the roofing substructure.

It is very common for secondary flashing members to be installed over a roof mount attached via fasteners and the outer edges of the flashing member welded to an underlying primary membrane to provide an additional water seal layer above the puncture holes. A drawback with this common technique is that it is difficult and cumbersome to effectively weld the outer edge of the flashing member around the edges of a mount without unwanted waves or ripples in the membrane material around the perimeter of the flashing. Such ripples in the welded flashing can lead to weakness and ultimately failure of the attachment to the primary membrane and thus the fluid seal.

It is highly desirable to provide an adapter, system and/or attachment method tightly and smoothly welding flashing members around roof mounts without waves in the material. Such an adapter, system and/or method would provide improved integrity of the roof to provide an effective, mechanically sound and fluid tight system for supporting equipment above the top of the roof and which effectively and efficiently seals with the roof structure.

SUMMARY

Briefly stated, in accordance with one aspect of the invention, a roof mount installation assembly is disclosed. The roof mount installation assembly includes a roof mount, a flashing patch, and an adapter cap. The roof mount has a base and a threaded post. The flashing patch has an opening. The flashing patch is configured to surround the base. The opening is configured to allow the threaded post to extend therethrough. The adapter cap is configured to be removably mounted over the flashing patch. The adapter cap is configured to apply a force to the flashing patch for sealing the flashing patch around the roof mount.

In accordance with another aspect of the invention, a method of installing a roof mount is disclosed. The method includes the following: a roof mount is attached over a membrane of a roof structure. A flashing patch is provided over the roof mount. An adapter cap is mounted over the flashing patch. The adapter cap is configured to apply a force to the flashing patch for sealing the flashing patch around the roof mount.

DETAILED DESCRIPTION

With reference to the drawings wherein like numerals represent like parts throughout the figures, a removable adapter cap used for installing a roof mount assembly is generally designated by the numeral 10. The removable adapter cap 10 is configured to provide for efficient and robust installation of the roof mount assembly (or roof mount) to a flat roof without jeopardizing the integrity of the roof itself while also providing a highly stable anchor and securement connection for various equipment types and allowing for an effective water seal for the installed roof mount assembly. For example, the roof mount is generally adapted for securing a rack or frame of rooftop equipment such as a solar panel, an air conditioner, a heat exchanger, a communication module, etc., to the flat roof.

Figure 1:
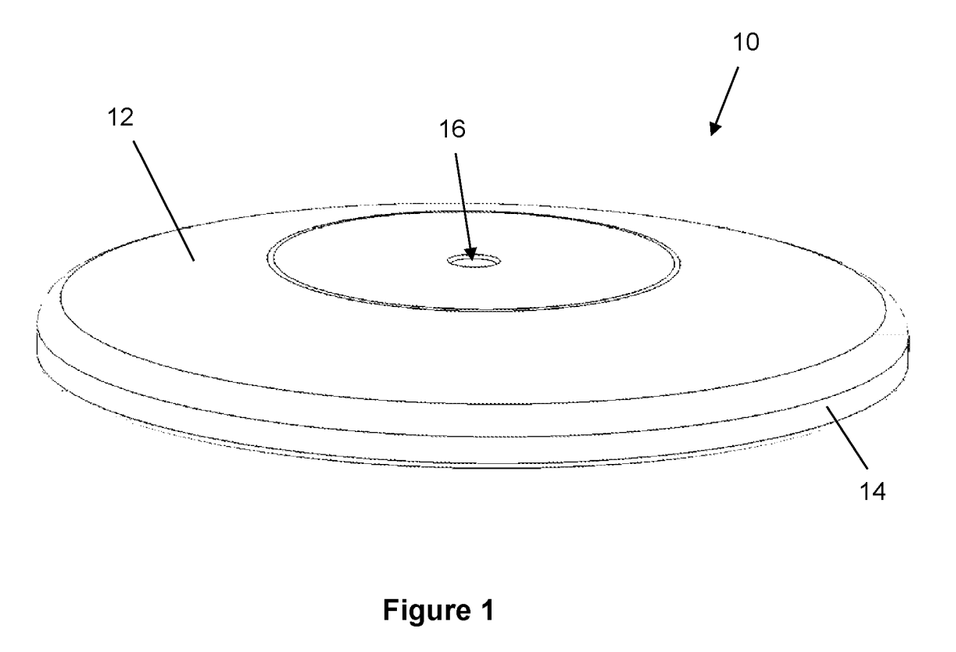
FIG. 1 is a perspective view of a removable adapter cap.
Figure 2:
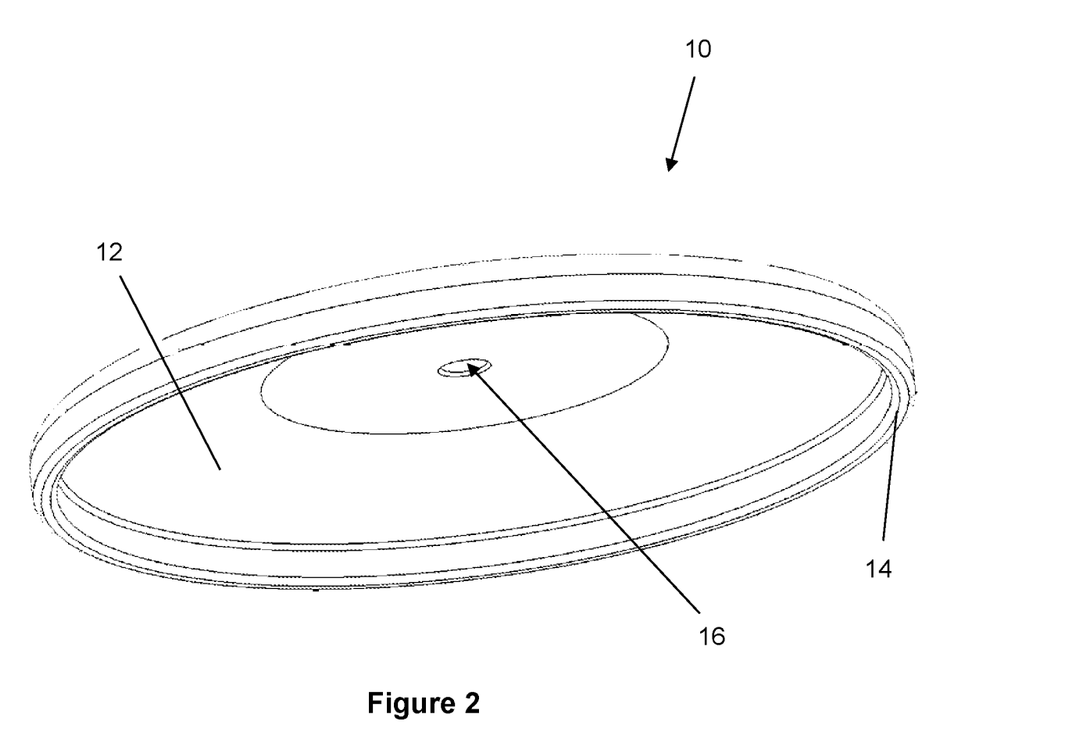
FIG. 2 is another perspective view of the removable adapter cap shown in FIG. 1.
Figure 3:
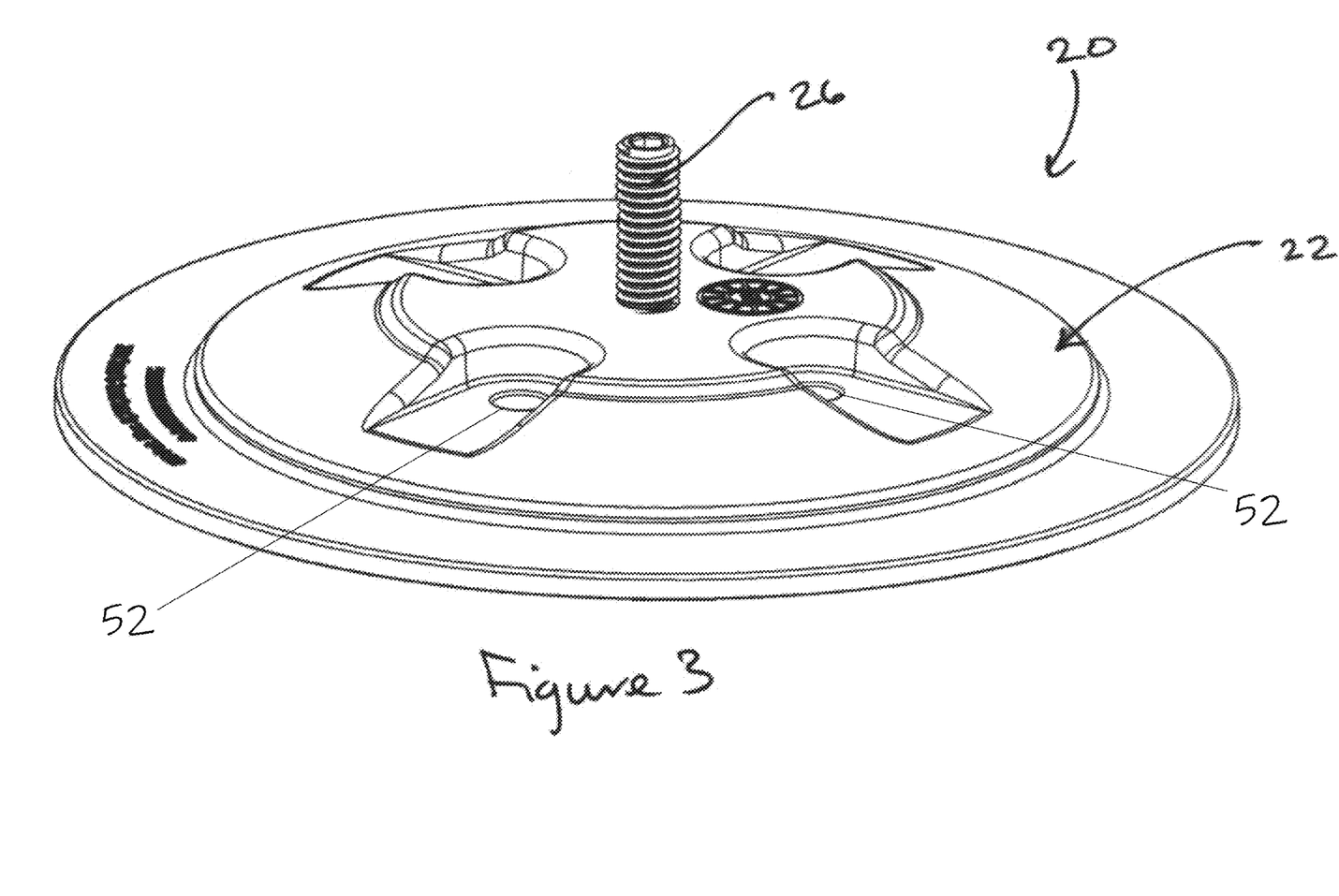
FIG. 3 is a perspective view of a roof mount assembly.
Figure 4:
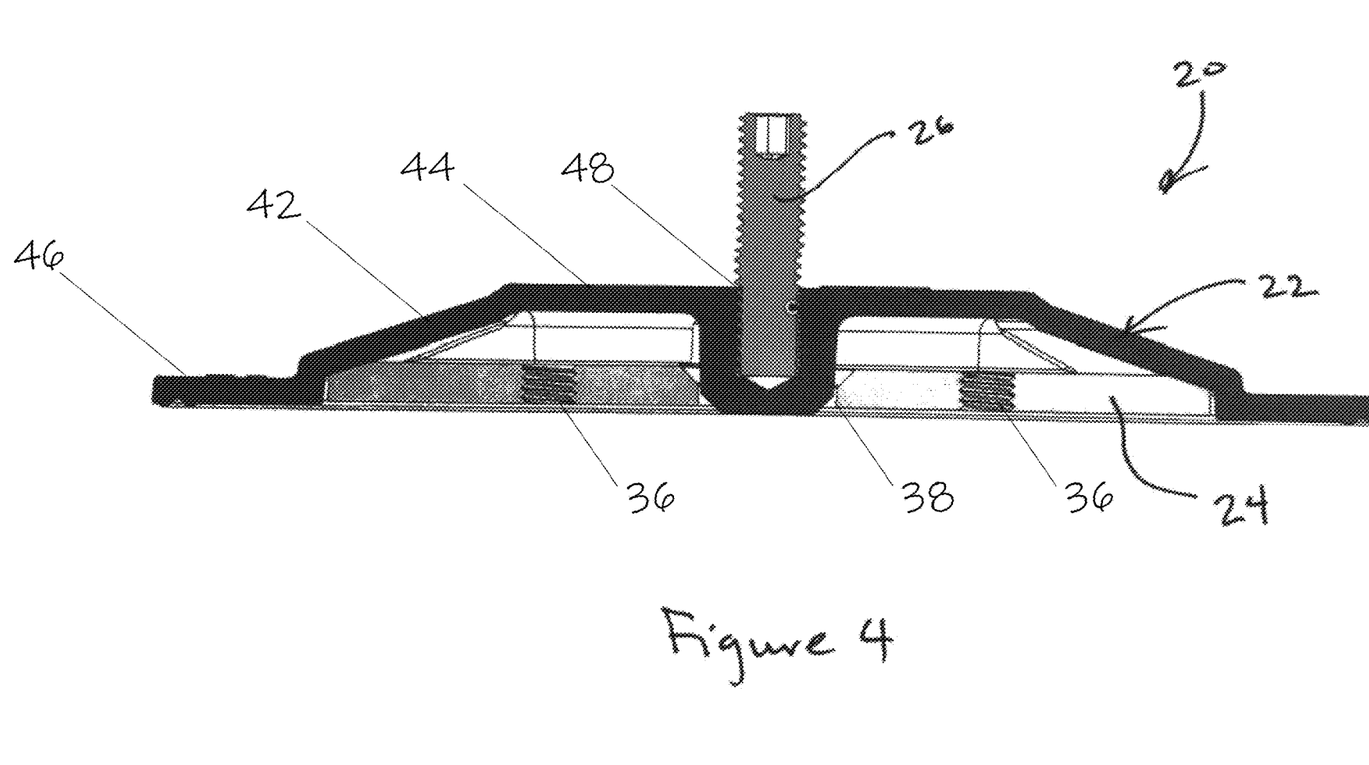
FIG. 4 is a section view of the roof mount assembly shown in FIG. 3.
Figure 5:
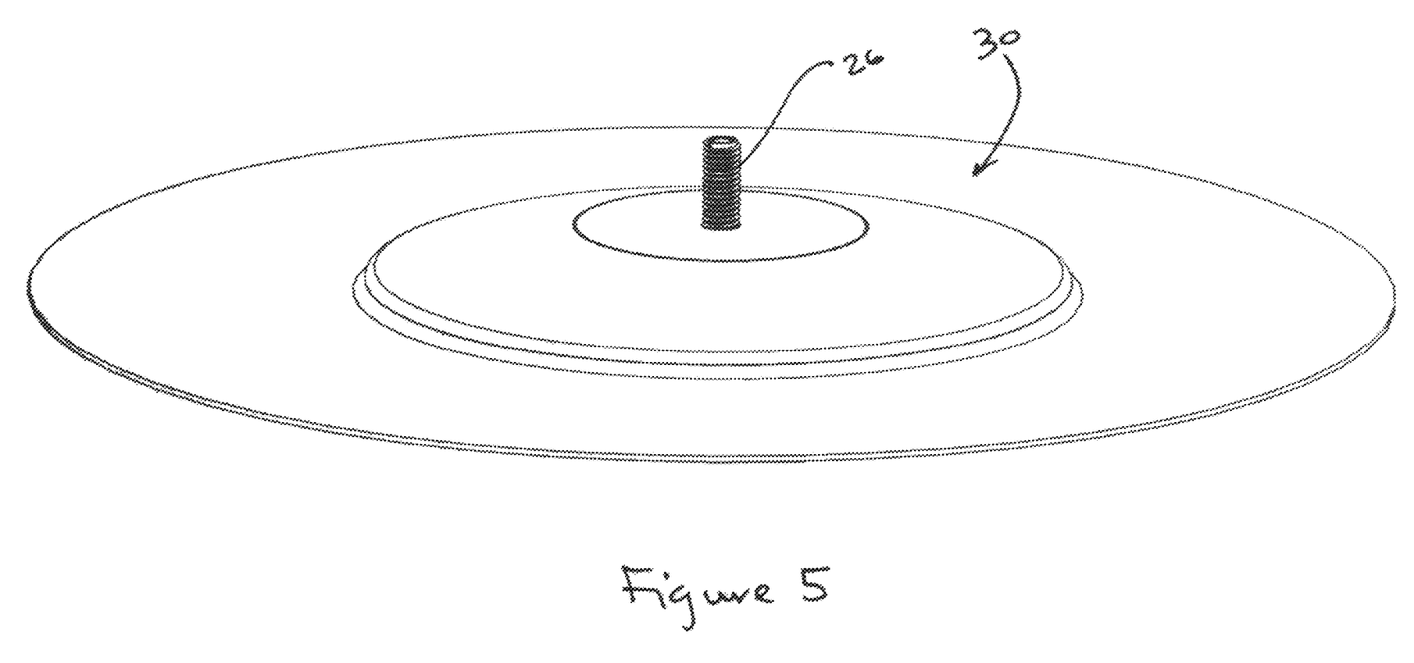
FIG. 5 is a perspective view of the removable adapter cap shown in FIG. 1 over a flashing patch.
Figure 6:
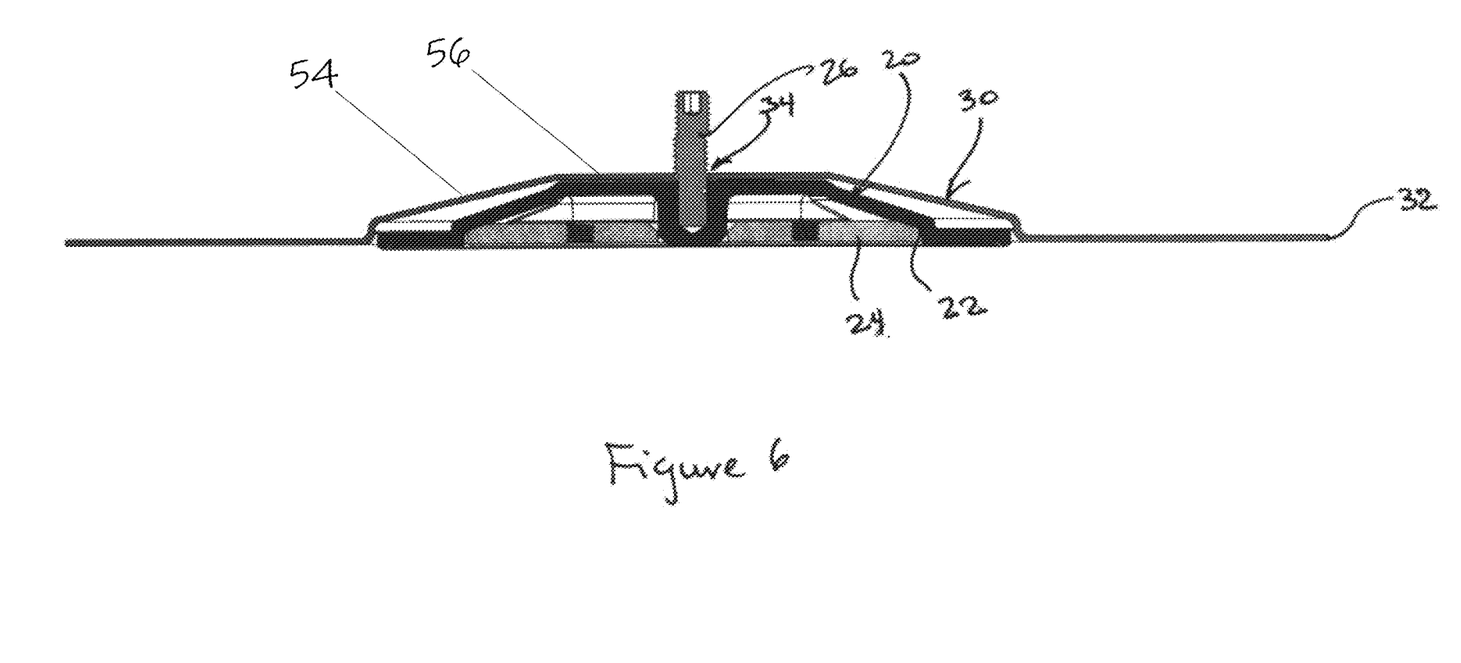
FIG. 6 is a section view of the roof mount assembly shown in FIG. 3 with the flashing patch shown in FIG. 5.
Figure 7:
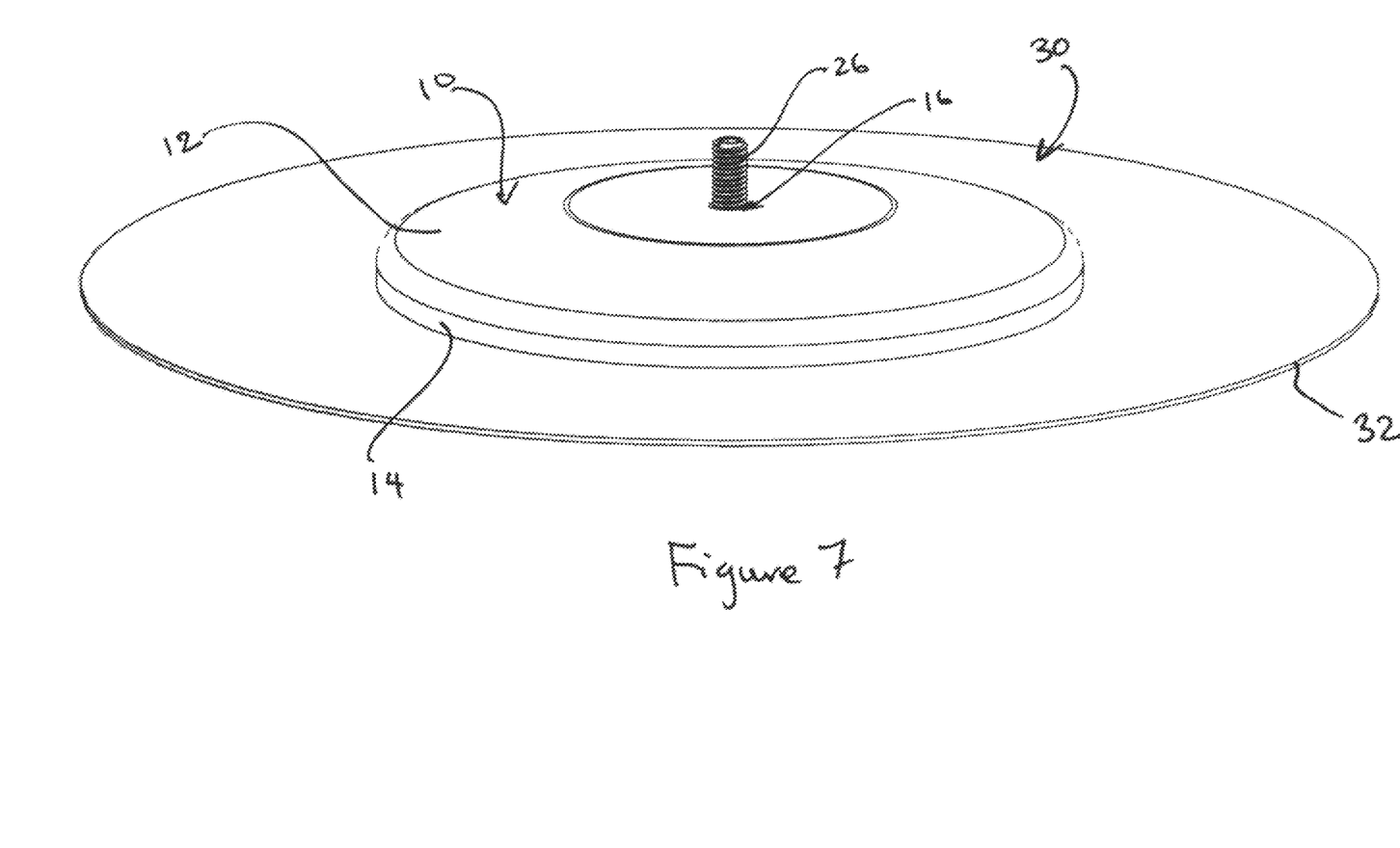
FIG. 7 is another perspective view of the removable adapter cap shown in FIG. 1 over the flashing patch.

Referring now to FIGS. 1 and 2, the adapter cap 10 comprises a one-piece member having central portion 12 and an outer rim portion 14. The central portion 12 comprises an opening 16, and the outer rim 14 extends from a periphery of the central portion 12. According to various exemplary embodiments, the cap is preferably formed from metal or other rigid material, such as plastic, for example. The cap 10 comprises a profile shape configured to surround the roof mount as will be described in further detail below.

Figure 13:
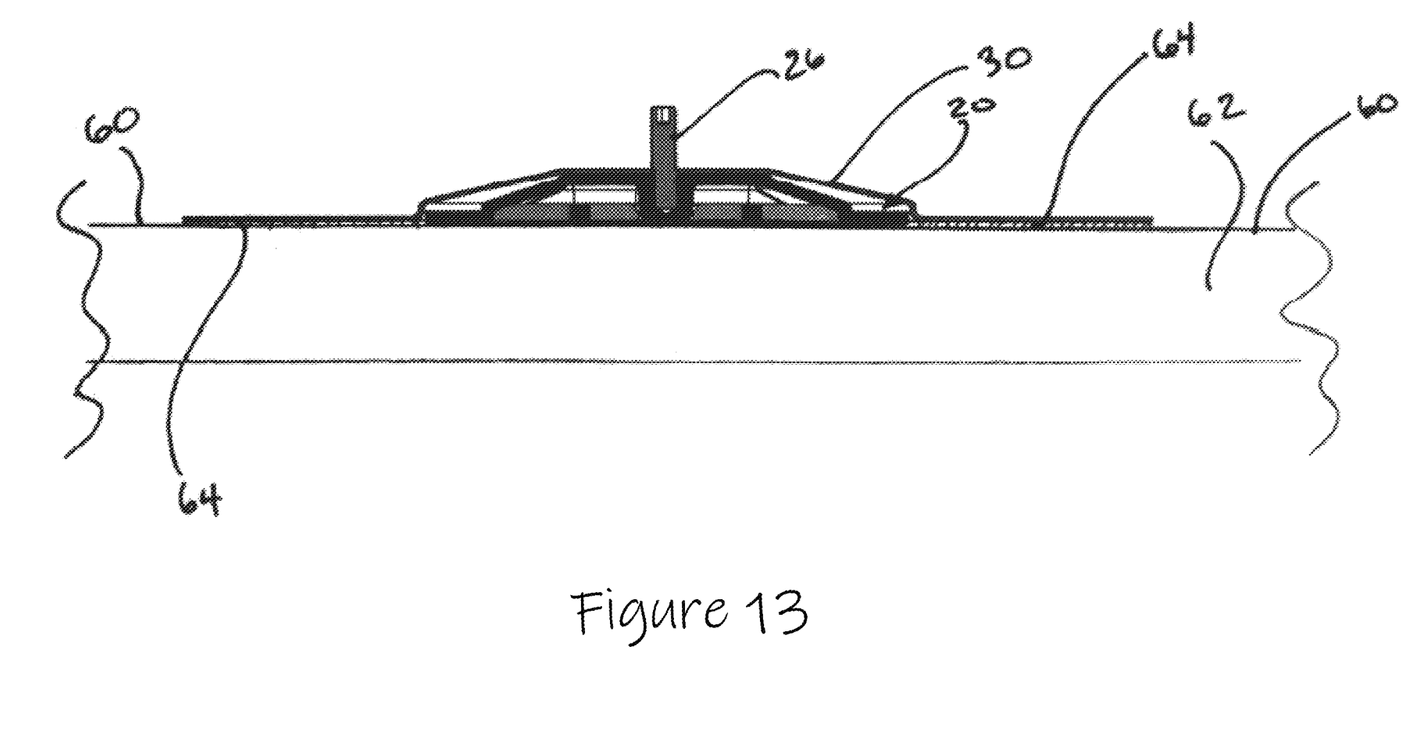
FIG. 13 is another section view of the roof mount assembly shown in FIG. 3 with the flashing patch shown in FIG. 5 and the removable cap shown in FIG. 1 after a welding process is completed.
Figure 14:
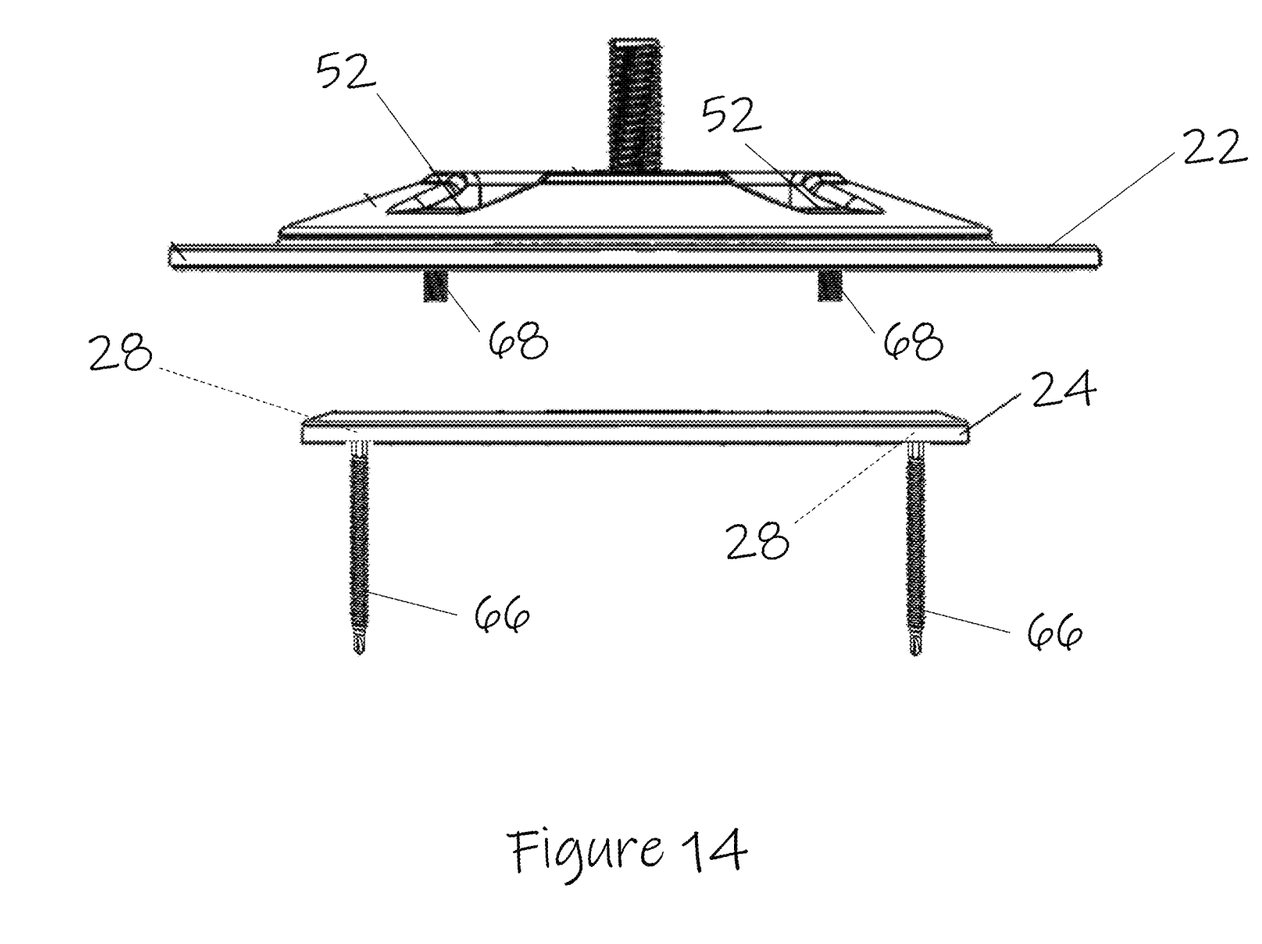
FIG. 14 is a partial exploded view of the roof mount assembly of FIG. 3 with connecting bolts and fasteners illustrated.

The roof mount assembly 20 may be installed in connection with a representative flat roof system comprising an insulation layer 62 (over roof decking, such as corrugated roof decking, for example) and a water impervious membrane 60 (see installed configuration shown in FIG. 13). The roof mount system 20 is mounted on top of the roofing system and secured by roofing fasteners 66 (shown in FIG. 14) which extend (through the membrane 60 and the insulation layer 62) to the roof decking. According to some embodiments, the roof mount assembly 20 may also be employed with alternative roof support structures.

Referring now also to FIGS. 3-11, the roof mount assembly preferably has an axially symmetric two-part base formed from a generally circular multi-level top plate 22 and a generally circular bottom plate 24. The assembled plates form a low profile and cooperate to allow for a high degree of fluid sealing integrity. Upon installation, the roof mount assemblies provide a durable and reliable structure having a high degree of connection integrity. The sealing of the roof mount assemblies with the roof can be accomplished in an orderly, neat manner which facilitates ready inspection.

The bottom plate (or base) 24 comprises a solid body having a substantially circular footprint. The bottom plate 24 further comprises attachment openings 28 for receiving the elongated fasteners 66 (shown in FIG. 14) which secure the roof mount to the roof structure.

The bottom plate 24 also defines a plurality (preferably four) of secondary holes 36 and a central opening 38. The secondary holes 36 are tapped to receive a bolt 68 (shown in FIG. 14) and are equidistantly spaced from the center of the plate 24.

According to various exemplary embodiments, the top plate 22 has a diameter greater than that of the bottom plate 24. In one embodiment, the top plate 22 and the bottom plate 24 have diameters of 7 inches and 5 inches, respectively (however, in alternate embodiments, any suitable plate diameters may be provided). The top plate 22 includes a central truncated crown 42 with a flat upper surface 44 and a radially outer peripheral flange 46.

The crown 42 has a central tapped aperture 48 and four recesses surrounding cylindrical attachment bores 52 which are spaced about the central tapped aperture 48. The recesses are dimensioned to allow for tightening and sealing of the bolts 68 (shown in FIG. 14). A connector bolt 26 is threaded to the aperture 48 and extends longitudinally from the crown to provide the anchor connecting structure for the roof mount assembly.

In a typical installation, the bottom plate 24 is placed on top of the membrane 60. The plate 24 is then secured via fasteners 66 driven through the openings 28 into the roofing structure. After the bottom plate 24 is attached, the top plate 22 is mounted over the secured bottom plate 24. Each of the attachment holes 52 in the top plate 22 align with the hole 36 in the bottom plate 24. According to some embodiments, the outer edge of the bottom plate 24 can be fitted with a sealing member to help affect a fluid-tight seal around the bottom plate. When the top plate 22 is mounted on the bottom plate 24, the outer flange 46 lays substantially flat on the roof membrane 60 around the outer edge of the bottom plate 24 and the portion surrounding the central aperture 48 of the top plate 22 is received in the central opening 38 of the bottom plate 24. The fasteners 68 are tightened through the aligned opening 52 into the tapped holes 36 to secure the top plate 22 to the bottom plate 24 and the roof.

Additional sealing members may be optionally added or incorporated into the top plate 22, such as caulking around the outer edge and/or fastener heads and/or additional O-rings.

When installed, the top plate 22 firmly cooperates with the bottom plate 24 to provide positional stability for the fasteners 66 that are installed within the openings 28 in the bottom plate 24 to urge and maintain the fasteners 66 in parallel relationship in a substantially perpendicular relationship with the base bottom plate 24 and the roof structure decking.

After the roof mount 20 is installed, a membrane flashing (or flashing patch) 30 having a conformed geometry which closely fits over the installed roof mount 20 is provided. The preferred flashing 30 includes a peripheral annular skirt 32 and a truncated conical central cover 54 including a planar top surface 56 which is generally complementary to that of the upper surface of the top plate 22 and is angled to accommodate the truncated crown 42 of the top plate 22. The membrane flashing 30 includes a central opening 34 which aligns with the tapped hole 48 of the top plate 22. The connector bolt 26 projects above the top plate 22 and is received through the flashing opening 34.

Figure 12:
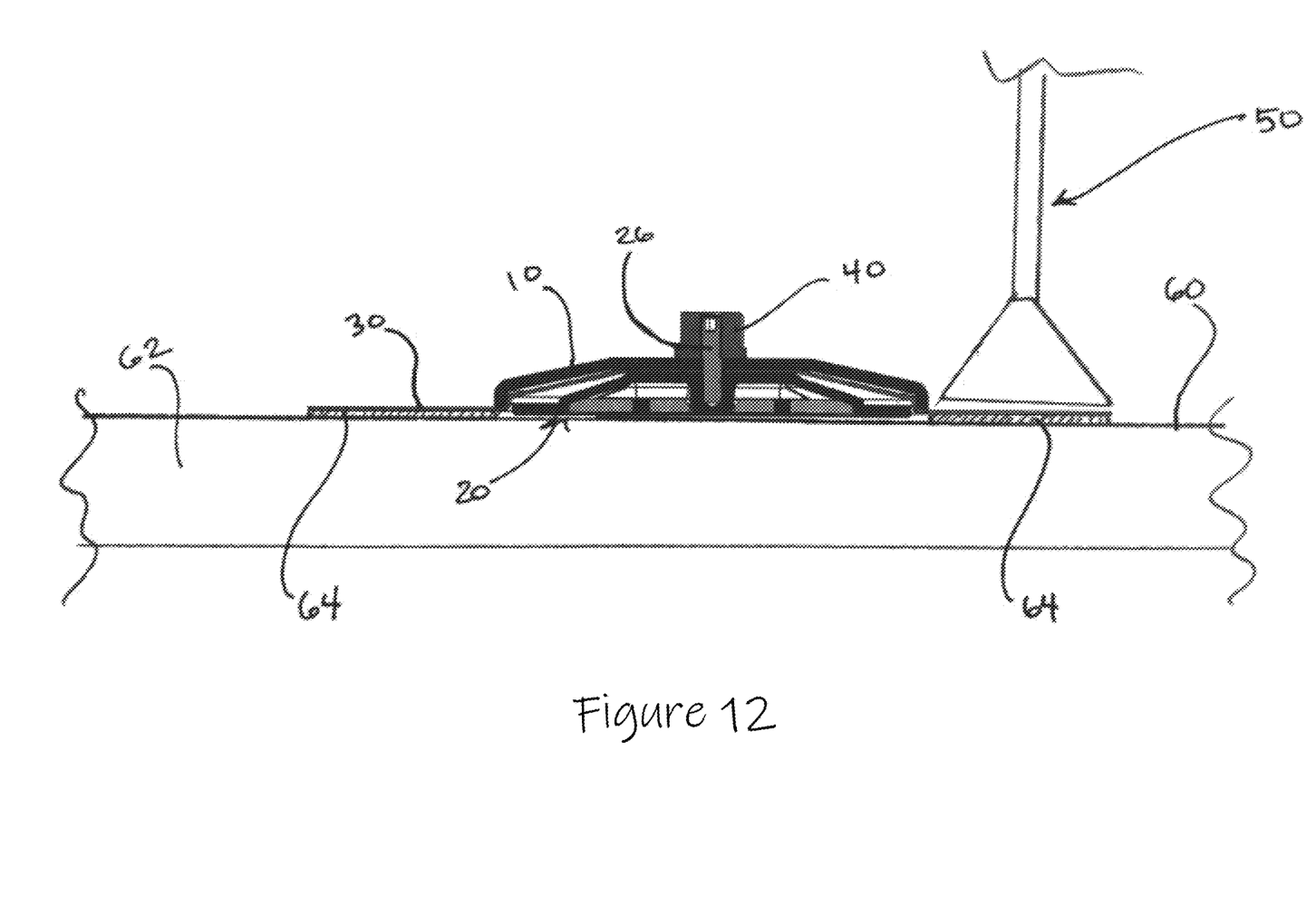
FIG. 12 is another section view of the roof mount assembly shown in FIG. 3 with the flashing patch shown in FIG. 5 and the removable cap shown in FIG. 1 with welding equipment and welding areas illustrated.

With the flashing patch 30 in place, the removable adapter cap 10 is now provided to facilitate the welding process. The removable cap 10 (with a contour to approximately match that of the roof mount 20) is mounted over the flashing patch 30 and the mount 20, and then secured in place via nut 40 threaded to the connector bolt 26 of the mount 20 (which extends through the opening 16 of the cap 10). This creates a tight seal around the edges of the mount 20 and the installer can manipulate welding equipment 50 proximate weld area 64 to weld the outer surfaces of the flashing patch 30 to the membrane 60. The tight seal around the edges of the mount 20 facilitates the welding process so that the installer can weld the outer surfaces of the flashing neatly and tightly (see FIG. 12).

Figure 8:
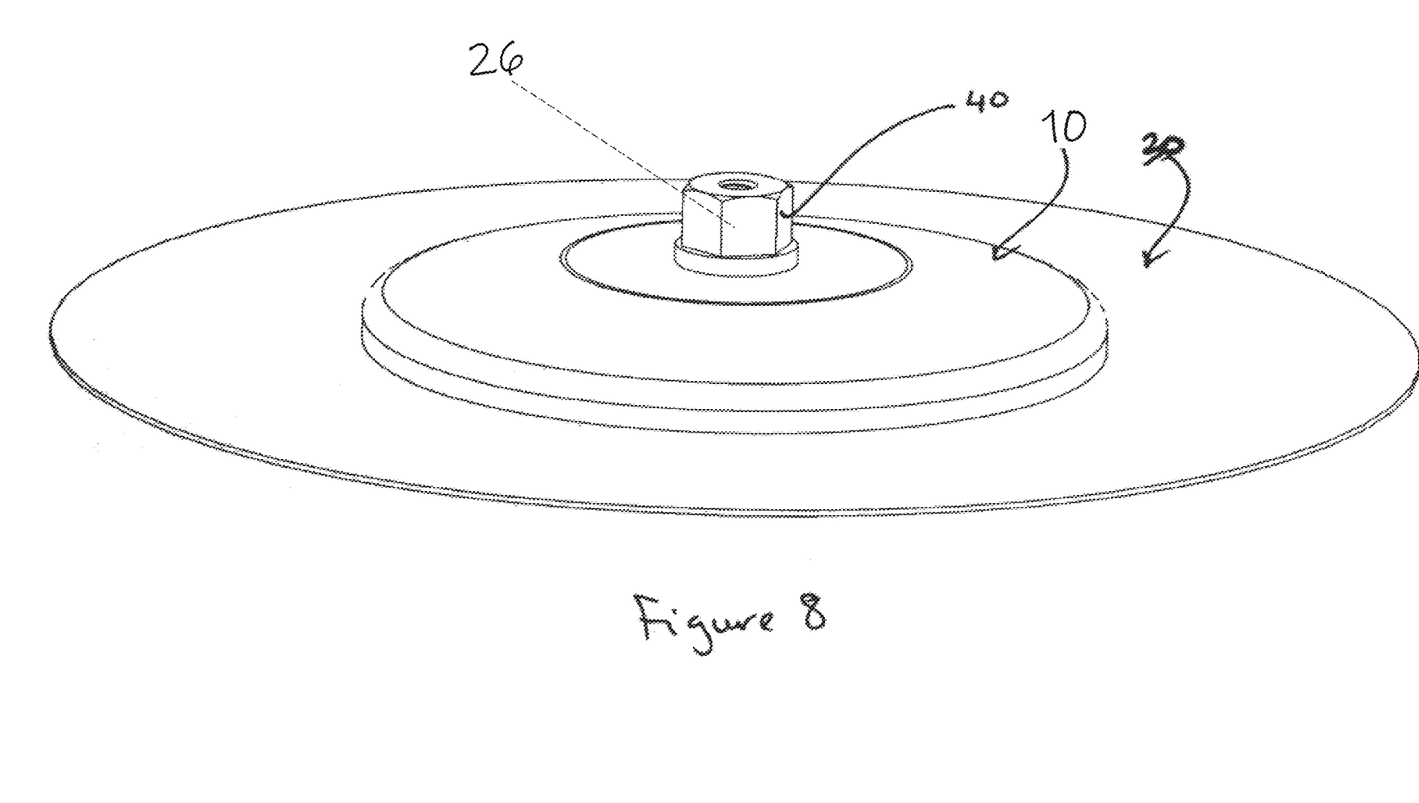
FIG. 8 is another perspective view of the removable adapter cap shown in FIG. 1 over the flashing patch with an installed nut.
Figure 9:
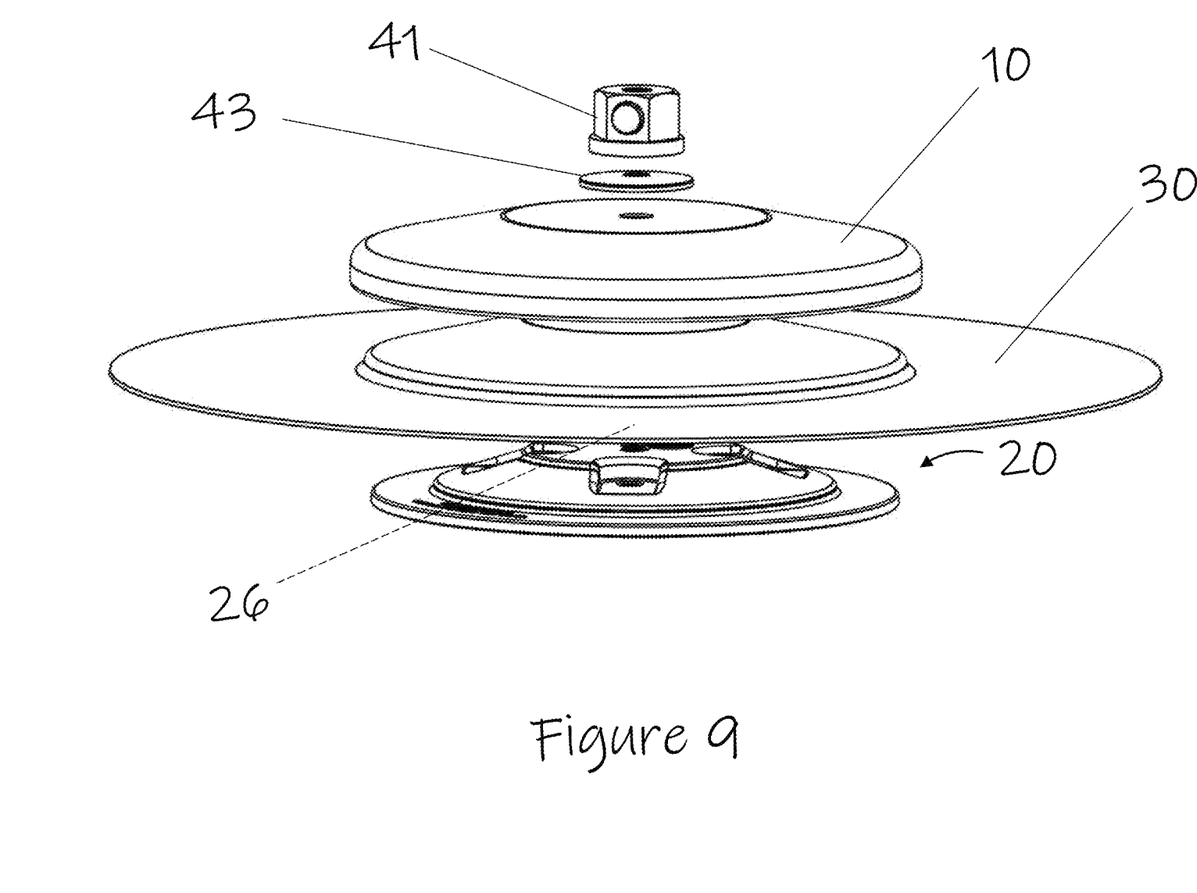
FIG. 9 is an exploded assembly view of the roof mount assembly shown in FIG. 3, the flashing patch shown in FIG. 5, and the removable cap shown in FIG. 1, with an alternate fastener configuration.
Figure 10:
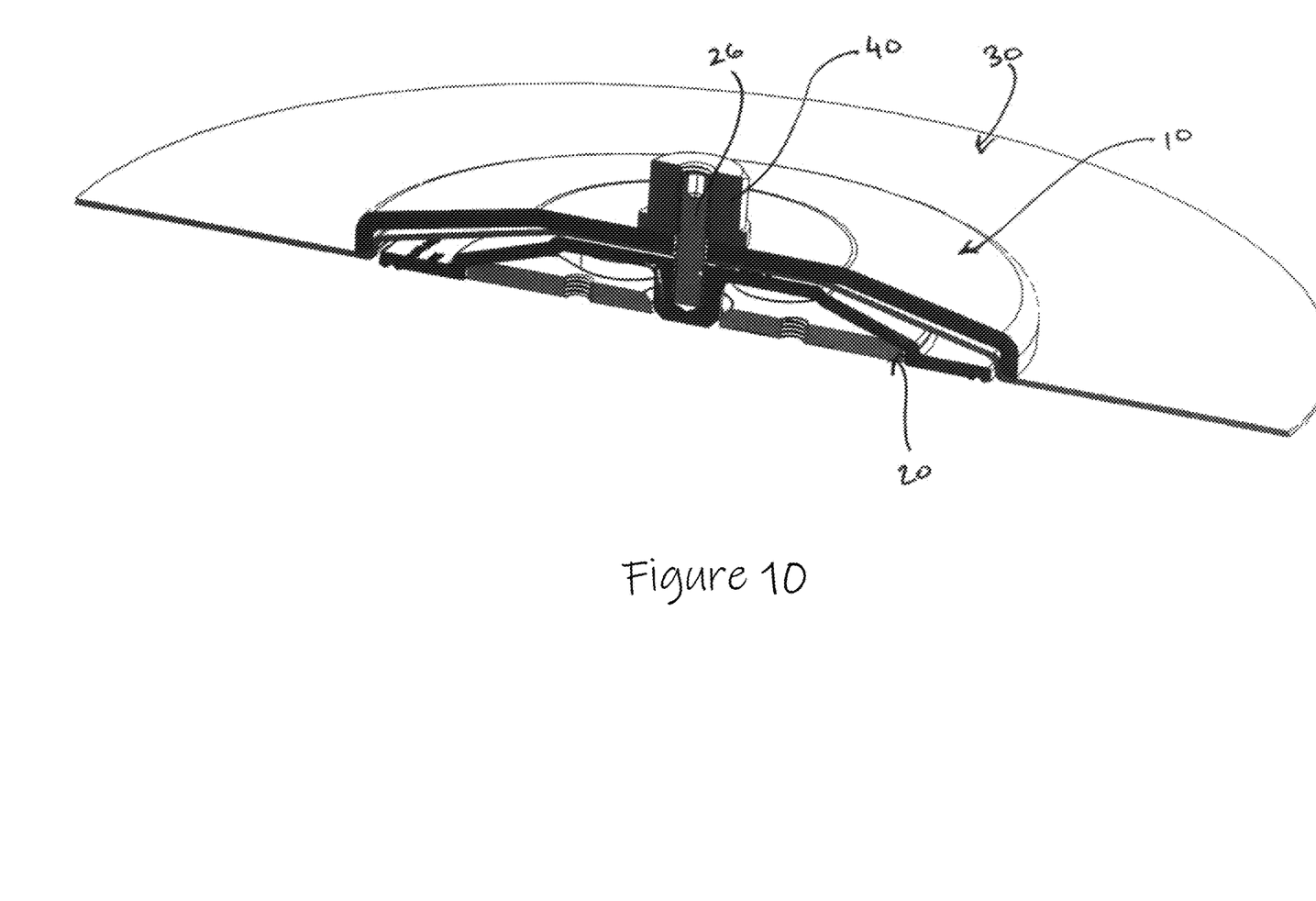
FIG. 10 is a section view of the roof mount assembly shown in FIG. 3 with the flashing patch shown in FIG. 5 and the removable cap shown in FIG. 1.
Figure 11:
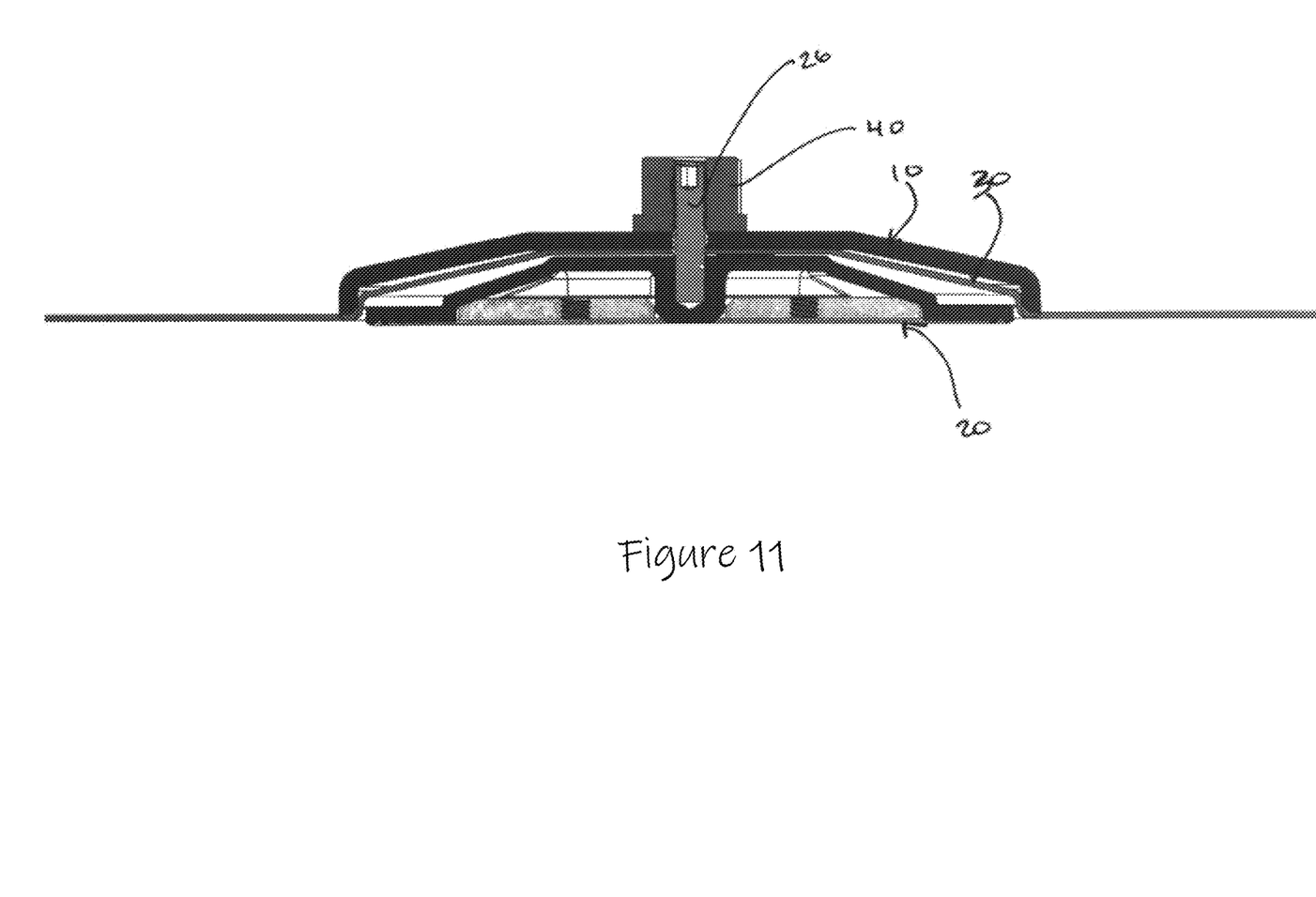
FIG. 11 is another section view of the roof mount assembly shown in FIG. 3 with the flashing patch shown in FIG. 5 and the removable cap shown in FIG. 1.

According to some example embodiments, the nut 40 comprises a standard hex nut 40 which directly contacts the cap 10 when the nut 40 is threaded on to the connector bolt 26 (as shown in FIG. 8). In some alternate example embodiments, the nut may comprise a speed nut (or push-button slide-adjust nut) 41 which is threaded on to the connector bolt 26 with a washer 43 (which may be a neoprene washer, for example) therebetween (as shown in FIG. 9). However, in other alternate embodiments, any suitable nut and/or interface between the nut and cap may be provided.

Once the welding step is complete, the cap 10 is removed and the roof mount is used as usual (see FIG. 13). For example, the bolt 26 preferably receives a bracket which connects with the equipment, a rack and/or the equipment frame (which can be secured with the nut 40).

Technical effects of any one or more of the exemplary embodiments provide for improved roof mount installation, as a common problem in the installation of roof mounts is that welding the patch by hand is difficult and causes a lot of ripples around the edges of the mount. The adapter cap is therefore configured to apply a force to the flashing patch for sealing the flashing patch around the roof mount to create a tight seal which promotes a desirable weld interface. With this improved interface, compromised weld areas are minimized.

Although various exemplary embodiments have been described above in connection with an adapter cap having a concave side (corresponding to the profile of the roof mount) facing the roof mount and a convex side facing opposite the roof mount and an outer rim surrounding the edges of the roof mount, one skilled in the art will understand that this configuration is not required and any suitable configuration capable of providing a tight seal around the roof mount may be provided.

It should further be noted that although the roof mount assembly shown in the embodiments above comprises a two-piece roof mount assembly, alternate embodiments may provide the adapter cap and flashing patch over any other suitable type of roof mount assembly (such as a one-piece, roof mount assembly, for example).

Below are provided further descriptions of various non-limiting, exemplary embodiments. The below-described exemplary embodiments may be practiced in conjunction with one or more other aspects or exemplary embodiments. That is, the exemplary embodiments of the invention, such as those described immediately below, may be implemented, practiced or utilized in any combination (e.g., any combination that is suitable, practicable and/or feasible) and are not limited only to those combinations described herein and/or included in the appended claims.

In one exemplary embodiment, a roof mount installation assembly comprising: a roof mount having a base and a threaded post; a flashing patch having an opening, wherein the flashing patch is configured to surround the base, and wherein the opening is configured to allow the threaded post to extend therethrough; and an adapter cap configured to be removably mounted over the flashing patch, wherein the adapter cap is configured to apply a force to the flashing patch for sealing the flashing patch around the roof mount.

A roof mount installation assembly as above, wherein the base of the roof mount is configured to be attached over a membrane of a roof structure.

A roof mount installation assembly as above, wherein the flashing patch is configured to be sealed to the membrane.

A roof mount installation assembly as above, wherein the flashing patch is configured to be welded to the membrane.

A roof mount installation assembly as above, wherein the outer edge of the adapter cap is configured to be between the base and a welded area of the flashing patch and the membrane.

A roof mount installation assembly as above, wherein the adapter cap is configured to apply the force to the flashing patch along a perimeter of the adapter cap.

A roof mount installation assembly as above, wherein the adapter cap comprises a contour corresponding to the roof mount.

A roof mount installation assembly as above, wherein the roof mount further comprises a top plate, wherein the top plate is between the base and the flashing patch, and wherein the adapter cap surrounds the base and top plate.

A roof mount installation assembly as above, wherein the roof mount installation assembly further comprises a nut, wherein the nut is configured to be threaded on to the threaded post for securing the adapter cap over the flashing patch.

A roof mount installation assembly as above, wherein the adapter cap comprises a contour corresponding to the flashing patch.

In another exemplary embodiment, a method of installing a roof mount comprising: attaching a roof mount over a membrane of a roof structure; providing a flashing patch over the roof mount; and mounting an adapter cap over the flashing patch, wherein the adapter cap is configured to apply a force to the flashing patch for sealing the flashing patch around the roof mount.

A method of installing a roof mount as above, further comprising sealing the flashing patch to the membrane.

A method of installing a roof mount as above, further comprising welding the flashing patch to the membrane.

A method of installing a roof mount as above, further comprising removing the adapter cap after flashing cap is welded to the membrane.

A method of installing a roof mount as above, further comprising aligning an opening of the adapter cap with a threaded post of the roof mount.

A method of installing a roof mount as above, further comprising threading a nut on to a threaded post of the roof mount for securing the adapter cap over the flashing patch and the roof mount.

A method of installing a roof mount as above, wherein the adapter cap is removably mounted over the flashing patch.

A method of installing a roof mount as above, wherein the adapter cap is configured to apply the force to the flashing patch along a perimeter of the adapter cap.

A method of installing a roof mount as above, wherein the adapter cap comprises a contour corresponding to the roof mount.

A method of installing a roof mount as above, wherein the attaching of the roof mount over the membrane of the roof structure further comprises securing the roof mount to the roof structure with fasteners extending through the membrane.

While preferred embodiments of the foregoing have been set forth for purposes of illustration, the foregoing description should not be deemed a limitation of the invention herein. Accordingly, various modifications, adaptations and alternatives may occur to one skilled in the art without departing from the spirit and the scope of the present invention. Accordingly, various exemplary embodiments of the invention are intended to embrace all such alternatives, modifications and variances which fall within the scope of the appended claims.

The invention claimed is:

1. A roof mount installation assembly comprising:
   a roof mount having a base with an outer periphery and a threaded post;
   a flashing patch having an opening, wherein the flashing patch is configured to surround the base, and wherein the opening is configured to allow the threaded post to extend therethrough; and
   a removable adapter cap with an outer edge configured to be a removably mounted over the flashing patch with the outer edge circumscribing the outer periphery of the roof mount such that the adapter cap envelops the roof mount and an inner portion of the flashing patch and applies a force to the flashing patch around the outer periphery of the roof mount for sealing an outer portion of the flashing patch around the roof mount and then (b) removed from the flashing patch, yielding an installed roof mount with flashing patch sealed around the roof mount.

2. The roof mount installation assembly of claim 1 wherein the base of the roof mount is configured to be attached over a membrane of a roof structure.

3. The roof mount installation assembly of claim 2 wherein the flashing patch is configured to be welded to the membrane.

4. The roof mount installation assembly of claim 1, wherein the outer periphery of the mount and the outer edge of the adapter cap are each substantially circular.

5. The roof mount installation assembly of claim 1, wherein the base has a top that includes a central truncated crown with a flat upper surface, and a radially outer peripheral flange.

6. The roof mount installation assembly of claim 5, wherein the flashing patch a peripheral annular skirt and a truncated conical central portion with a flat top portion that is generally complementary to the flat upper surface of the crown of the base.

7. The roof mount installation assembly of claim 1 wherein the adapter cap comprises a contour corresponding to the roof mount.

8. The roof mount installation assembly of claim 1 wherein the roof mount further comprises a top plate, wherein the top plate is between the base and the flashing patch, and wherein the adapter cap surrounds the base and top plate.

9. The roof mount installation assembly of claim 1, further comprising a nut, configured to be removably threaded on to the threaded post for securing the adapter cap over the flashing patch.

10. A method of installing a roof mount comprising:
attaching a roof mount with an outer periphery over a membrane of a roof structure;
providing a flashing patch over the roof mount, the flashing patch extending outside the outer periphery of the roof mount;
mounting an adapter cap over the flashing patch, to apply a force to the flashing patch in a direction toward the membrane;
sealing the flashing patch to the membrane around the outer periphery of the roof mount; and
removing the adapter cap from the flashing patch.

11. The method of claim 10, wherein the step of attaching the roof mount over the membrane of the roof structure comprises driving fasteners through openings of a portion of the roof mount and into the roof structure with fasteners extending through the membrane.

12. The method of claim 10, wherein the adapter cap comprises an annular outer rim that sandwiches a section of the flashing patch around the outer periphery of the roof mount to the membrane when the adapter cap is mounted.

13. The method of claim 10, wherein the step of sealing includes welding the flashing patch to the membrane.

14. The method of claim 10, wherein the periphery of the base is substantially circular and the adapter cap has a substantially circular outer rim that closes around the outer periphery when the adapter cap is mounted.

15. The method of claim 10, wherein the step of mounting includes aligning an opening of the adapter cap with a threaded post of the roof mount such that the threaded post projects through the opening.

16. The method of claim 15, further comprising a step of threading a nut on to a threaded post of the roof mount after mounting the adapter cap to secure the adapter cap over the flashing patch and the roof mount for the step of sealing the flashing patch.

17. The method of claim 10, wherein the adapter cap traps a section of the flashing patch against the membrane around the entire outer periphery of the base.

18. The method of claim 10, wherein the step of mounting applies at least a portion of the force to the flashing patch along the periphery of the adapter cap.

19. The method of claim 10, wherein the patch is substantially circular with a radially outer skirt that overlaps the membrane around the base.

20. A method of installing and sealing a roof mount comprising:
attaching a roof mount with an outer periphery over a membrane of a roof structure;
placing a flashing patch over the roof mount with an outer portion of the flashing patch overlapping a portion of the membrane outside the outer periphery of the roof mount;
providing an adapter cap having an outer rim having a size and shape to receive the roof mount within the outer rim;
mounting the adapter cap over the flashing patch with the roof mount within the outer rim, thereby sandwiching a section of the flashing patch outside the outer periphery of the roof mount against the membrane; and
sealing the outer portion of the flashing patch to the membrane around the outer periphery of the roof mount.

* * * * *

UNITED STATES PATENT AND TRADEMARK OFFICE
CERTIFICATE OF CORRECTION

| | | |
|---|---|---|
| PATENT NO. | : 11,668,095 B2 | Page 1 of 1 |
| APPLICATION NO. | : 17/444001 | |
| DATED | : June 6, 2023 | |
| INVENTOR(S) | : Peter J. Shadwell and Richard L. Belinda | |

It is certified that error appears in the above-identified patent and that said Letters Patent is hereby corrected as shown below:

In the Claims

Column 6, Claim 1, Line 55:
Delete "a" and insert --(a)--

Signed and Sealed this
First Day of August, 2023

Katherine Kelly Vidal
*Director of the United States Patent and Trademark Office*